(12) United States Patent
Elkanick et al.

(10) Patent No.: US 8,276,570 B2
(45) Date of Patent: Oct. 2, 2012

(54) METHOD AND APPARATUS FOR IMPROVED INTERNAL COMBUSTION OF FUEL/OXIDIZER MIXTURES BY NANOSTRUCTURE INJECTION AND ELECTROMAGNETIC PULSE IGNITION

(75) Inventors: Mark E. Elkanick, Tucson, AZ (US); Delmar L. Barker, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 370 days.

(21) Appl. No.: 12/692,492

(22) Filed: Jan. 22, 2010

(65) Prior Publication Data

US 2010/0236511 A1  Sep. 23, 2010

Related U.S. Application Data

(60) Provisional application No. 61/160,754, filed on Mar. 17, 2009.

(51) Int. Cl.
 *F02B 51/00* (2006.01)
(52) U.S. Cl. ........................................ 123/536; 123/606
(58) Field of Classification Search .................. 123/143, 123/169 R, 536, 1 A, 594, 606, 143 R
See application file for complete search history.

(56) References Cited

U.S. PATENT DOCUMENTS

| | | | |
|---|---|---|---|
| 4,064,852 A | 12/1977 | Fulenwider, Jr. | |
| 5,627,353 A * | 5/1997 | Oeste | 204/157.15 |
| 6,884,307 B1 * | 4/2005 | Hofmann et al. | 149/92 |
| 7,025,840 B1 * | 4/2006 | Adams | 149/108.2 |
| 2010/0180871 A1 * | 7/2010 | Ikeda et al. | 123/536 |

FOREIGN PATENT DOCUMENTS

| | | |
|---|---|---|
| DE | WO 99/37911 | 7/1999 |
| WO | WO 2005/059356 | 6/2005 |
| WO | WO 2007/030782 | 3/2007 |

OTHER PUBLICATIONS

A.L. Merlo "Combustion Chamber Investigations by means of Microwave Resonances", IEEE Trans. on Industrial Electronics and Control Instrumentation, vol. IECI-17, Issue 2, pp. 60-66, Apr. 1970.

* cited by examiner

*Primary Examiner* — John Kwon
(74) *Attorney, Agent, or Firm* — Eric A. Gifford (57) ABSTRACT

A system and method to inject nanostructures into the fuel/oxidizer mixture, typically lean mixtures, to increase efficiency of internal combustion and/or decrease pollution. An electromagnetic pulse (suitably 1 to 100 GHz) couples energy to the nanostructures to produce a volumetric combustion of the fuel oxidizer mixture. The fuel/oxidizer mixture is substantially transparent to the band of the electromagnetic pulse. The nanostructures couple to the electromagnetic radiation, absorb the energy and heat rapidly producing many local ignitions that in turn produce volume combustion. The nanostructures may be filled or partially filled with energetic material.

18 Claims, 7 Drawing Sheets

METHOD AND APPARATUS FOR IMPROVED INTERNAL COMBUSTION OF FUEL/OXIDIZER MIXTURES BY NANOSTRUCTURE INJECTION AND ELECTROMAGNETIC PULSE IGNITION

CROSS-REFERENCE TO RELATED APPLICATIONS

This application claims benefit of priority under 35 U.S.C. 119(e) to U.S. Provisional Application No. 61/160,754 entitled "Method and Apparatus for Improved Internal Combustion of Fuel/Oxidizer Mixtures by Nanostructure Injection and Electromagnetic Pulse Ignition" and filed on Mar. 17, 2009, the entire contents of which are incorporated by reference.

BACKGROUND OF THE INVENTION

1. Field of the Invention

This invention relates to internal combustion of fuel/oxidizer mixtures, and more particularly to the injection of nanostructures, possibly filled with energetic material, into the mixture and the ignition with an electromagnetic pulse to produce volume combustion that improves efficiency and controls NOx pollution.

2. Description of the Related Art

Combustion drives the developed world's economy. Transportation is second only to industrial use as the largest consumer of energy in the US and accounts for about 60% of our nation's use of petroleum—an amount equivalent to all of the oil the country imports. The numbers are staggering: Some 10,000 gallons of petroleum are burned in the US each second of every day. Although new energy sources are being developed and renewable fuels are emerging to replace crude oil, improvements in the efficiency of internal combustion engines hold the promise of increasing our energy securing and mitigating climate change.

The environmental consequences and health hazards posed from urban smog and other combustion byproducts led to US regulation in the late 1970s designed to limited emission of nitrogen oxides ($NO_x$), hydrocarbons, and other pollutants from internal combustion engines. Controlling those emissions while maintaining high efficiency is a continuing challenge. In the last decade, a combination of improved combustion technologies and exhaust after-treatments has nearly eliminated those emissions from gasoline spark-ignited engines. Emissions from the more efficient compression-ignited diesel engines have proven more difficult to control.

Figure 1:
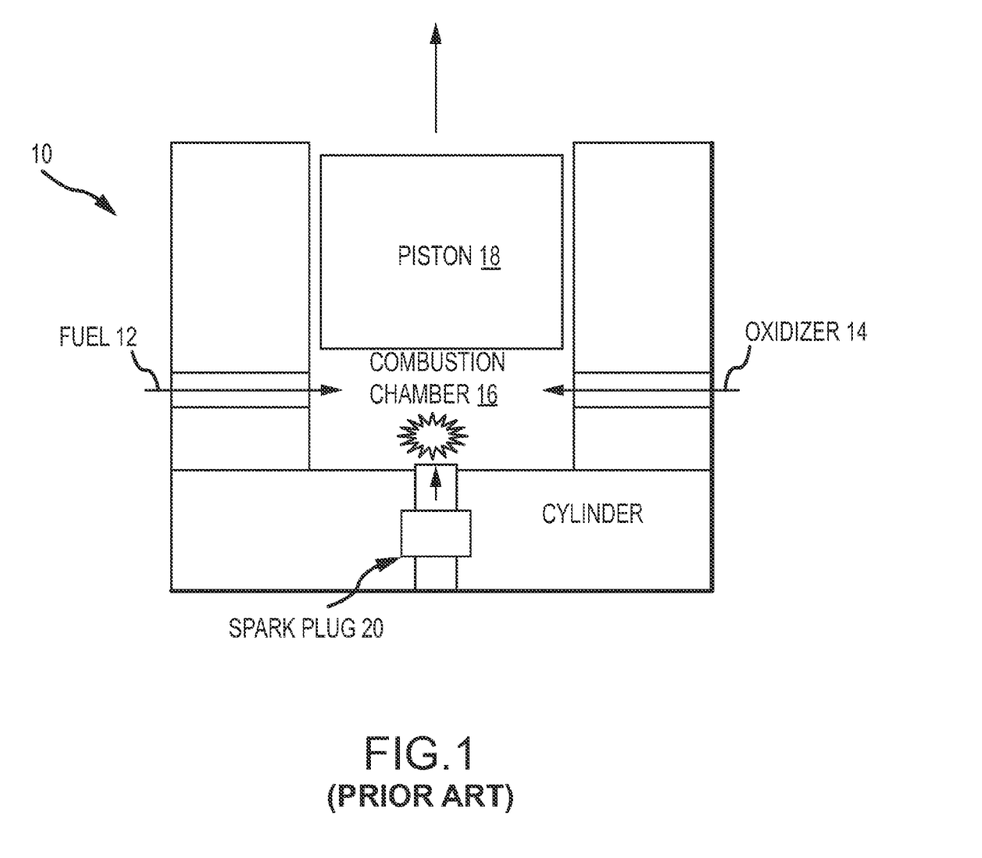
FIG. 1, as described above, is a diagram of an internal combustion engine.

An internal combustion engine 10 is an engine in which the combustion of a fuel 12 occurs with an oxidizer 14 (usually air) in a combustion chamber 16. In an internal combustion engine the expansion of the high temperature and pressure gases, that are produced by the combustion, directly apply force to a movable component 18 of the engine, such as the pistons within a cylinder or turbine blades and by moving it over a distance, generate useful mechanical energy. The term internal combustion engine usually refers to an engine in which combustion is intermittent, such as the more familiar four-stroke and two-stroke piston engines, along with variants, such as the Wankel rotary engine. All internal combustion engines must achieve ignition in their cylinders to create combustion. Typically engines use either a spark ignition (SI) method 20 or a compression ignition (CI) system. In the past, other methods using hot tubes or flames have been used.

All internal combustion engines depend on the exothermic chemical process of combustion: the reaction of a fuel, typically with oxygen from the air—although other oxidizers such as nitrous oxide may be employed. The combustion process typically results in the production of a great quantity of heat, as well as the production of steam and carbon dioxide and other chemicals at very high temperature; the temperature reached is determined by the chemical make up of the fuel and oxidizers. The most common modern fuels are made up of hydrocarbons and are derived mostly from fossil fuels (petroleum). Fossil fuels include diesel fuel, gasoline and petroleum gas, and the rarer use of propane. Except for the fuel delivery components, most internal combustion engines that are designed for gasoline use can run on natural gas or liquefied petroleum gases without major modifications. Large diesels can run with air mixed with gases and a pilot diesel fuel ignition injection. Liquid and gaseous biofuels, such as ethanol and biodiesel (a form of diesel fuel that is produced from crops that yield triglycerides such as soybean oil), can also be used. Some engines with appropriate modifications can also run on hydrogen gas. Combustion or burning is a complex sequence of exothermic chemical reactions between a fuel (usually a hydrocarbon) and an oxidant accompanied by the production of heat or both heat and light in the form of either a glow or flames, appearance of light flickering. In a complete combustion reaction, a compound reacts with an oxidizing element, such as oxygen and the products are compounds of each element in the fuel with the oxidizing element. For example:

$$CH_4 + 2O_2 \rightarrow CO_2 + 2H_2O$$

In the large majority of the real world uses of combustion, the oxygen ($O_2$) oxidant is obtained from the ambient air and the resultant flue gas from the combustion will contain nitrogen:

$$CH_4 + 2O_2 + 7.52N_2 \rightarrow CO_2 + 2H_2O + 7.52N_2 + heat$$

As can be seen, when air is the source of the oxygen, nitrogen is by far the largest part of the resultant flue gas.

In reality, combustion processes are never perfect or complete. In flue gases from combustion of carbon (as in coal combustion) or carbon compounds (as in combustion of hydrocarbons, wood etc.) both unburned carbon (as soot) and carbon compounds (CO and others) will be present. Also, when air is the oxidant, some nitrogen can be oxidized to various nitrogen oxides ($NO_x$).

The hot gases produced by the combustion occupy a far greater volume than the original fuel, thus creating an increase in pressure within the limited volume of the chamber. This pressure can be used to do work, for example, to move a piston on a crankshaft or a turbine disc in a gas turbine. The energy can also be used to produce thrust when directed out of a nozzle as in a rocket engine.

Air-fuel ratio (AFR) is the mass ratio of air to fuel present during combustion. When all the fuel is combined with all the free oxygen, typically within a vehicle's combustion chamber, the mixture is chemically balanced and this AFR is called the stoichiometric mixture. AFR is an important measure for anti-pollution and performance tuning reasons. For gasoline fuel, the stoichiometric air/fuel mixture is approximately 14.7 times the mass of air to fuel. Any mixture less than 14.7 to 1 is considered to be a rich mixture, any more than 14.7 to 1 is a lean mixture—given perfect (ideal) "test" fuel (gasoline consisting of solely n-heptane and iso-octane). Lean mixtures produce hotter combustion gases than does a stoichiometric mixture, so much so that pistons can melt as a result. Rich mixtures produces cooler combustion gases than does a stoichiometric mixture, primarily due to the excessive amount of carbon which oxidizes to form carbon monoxide, rather than carbon dioxide. The chemical reaction oxidizing carbon to form carbon monoxide releases significantly less heat than the similar reaction to form carbon dioxide. (Carbon monoxide retains significant potential chemical energy. It is itself a fuel whereas carbon dioxide is not.) Lean mixtures, when consumed in an internal combustion engine, produce less power than does the stoichiometric mixture. Similarly, rich mixtures return poorer fuel efficiency than the stoichiometric mixture. (The mixture for the best fuel efficiency is slightly different from the stoichiometric mixture.) The AFR for a stoichiometric mixture will depend on the particular fuel. Therefore, a "lean" mixture is one having an AFR greater than the AFR for the stoichiometric mixture.

Lean burn refers to the use of lean mixtures in an internal combustion engine. The air-fuel ratios can be as high as 65:1, so the mixture has considerably less fuel in comparison to the stoichiometric combustion ratio (14.7 for petrol for example). A lean burn mode is a way to reduce throttling losses. An engine in a typical vehicle is sized for providing the power desired for acceleration, but must operate well below that point in normal steady-speed operation. Ordinarily, the power is cut by partially closing a throttle. However, the extra work done in pumping air through the throttle reduces efficiency. If the fuel/air ratio is reduced, then lower power can be achieved with the throttle closer to fully open, and the efficiency during normal driving (below the maximum torque capability of the engine) can be higher. The engines designed for lean burning can employ higher compression ratios and thus provide better performance, efficient fuel use and low exhaust hydrocarbon emissions than those found in conventional petrol engines. Ultra lean mixtures with very high air-fuel ratios can only be achieved by Direct Injection engines. The main drawback of lean burning is the large amount of NOx being generated at relatively high air/fuel ratios (i.e. greater than stoichiometric but less than 30:1).

If the mixture is too lean, the flame front produced by the spark plug will burn out and some of the fuel will not be burned. This reduces efficiency and increases pollutants.

To address this problem attempts have been made to replace the single-point spark plug ignition with a microwave source. The idea being that the microwave pulse will ignite fuel/air mixture throughout the volume thereby creating volume combustion. To date these efforts have not produced results significantly better than the conventional spark plug. See U.S. Pat. No. 4,064,852 "Microwave energy apparatus and method for internal combustion engines", WO 99/37911 "Ignitiona nd Combution Support Device Using Microwave Technology For A Gasoline Engine", WO 2005/059356 "Method for Igniting Combustion of Fuel in a Combustion Chamber of an Engine, Associated Device and Engine, and WO 2007/030782 "Microwave Combustion System for Internal Combustion Engines", each of which are hereby incorporated by reference.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for increased efficiency of internal combustion and decreased pollution for fuel/oxidizer mixtures, typically lean mixtures.

This is accomplished by injecting nanostructures into the lean fuel/oxidizer mixtures and applying an electromagnetic pulse that couples energy to the nanostructures to produce a volumetric combustion of the fuel oxidizer mixture. The fuel/oxidizer mixture is substantially transparent to the band of the electromagnetic pulse. The nanostructures couple to the electromagnetic radiation, absorb the energy and heat rapidly producing many local ignitions that in turn produce volume combustion.

The nanostructures are materials that have at least one dimension in the nanometer scale (i.e. less than 1 micrometer). All three dimensions may be less than 1 micrometer. This definition of nanostructures encompasses nanotubes, nanowires, nanopowders and fullerenes. The nanostructures are suitably electrically conductive. The nanotubes or fullerenes may or may not be filled or partially filled with energetic ("explosive") materials. The nanostructures may be configured to further enhance the resonant coupling to the electromagnetic radiation, and to preferentially couple to electromagnetic radiation in a specific band.

The nanostructures may be provided as an "additive" that is pre-mixed with either the fuel or the oxidizer. The nanostructures may be simultaneously mixed with the fuel and oxidizer and than injected into the combustion chamber, mixed with the fuel/oxidizer and injected or all three directly injected and mixed into the combustion chamber.

The electromagnetic pulse preferably lies in a band in which the fuel/oxidizer mixture is largely transparent and which couples to the nanostructures. Suitable bands may lie between 1 and 100 GHz although other bands may be possible as well. An embodiment uses an approximately 10 GHz RF pulse. Another embodiment uses an approximately 2.45 GHz RF pulse. As such the pulse can penetrate through the volume of the mixture to ignite nanostructures throughout producing efficient volume combustion.

The injection of nanostructures may be continuous and uniform during the internal combustion process as the sole means of ignition. Alternately, both a single-point spark ignition and volume EM pulse ignition may be used in combination. Nanostructures may be selectively injected, for example, only when the mixture is too lean for standard spark ignition. Alternately, the nanostructures may be injected and pulse ignition used in a portion of the chamber away from the single-point ignition.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a system and method for increased efficiency of internal combustion and decreased pollution for fuel/oxidizer mixtures, typically lean mixtures. This is accomplished by injecting nanostructures into the fuel/oxidizer mixtures and applying an electromagnetic pulse that couples energy to the nanostructures to produce a volumetric combustion of the fuel oxidizer mixture. The fuel/oxidizer mixture may be substantially transparent to the band of the electromagnetic pulse. The nanostructures couple to the electromagnetic radiation, absorb the energy and heat rapidly producing many local ignitions that in turn produce volume combustion. The process may be further enhanced by filling or partially filling the nanostructures with energetic materials and/or shaping the nanostructures to more efficiently or preferentially couple to the frequency band of the electromagnetic pulse.

Nanostructures

Figure 2A:
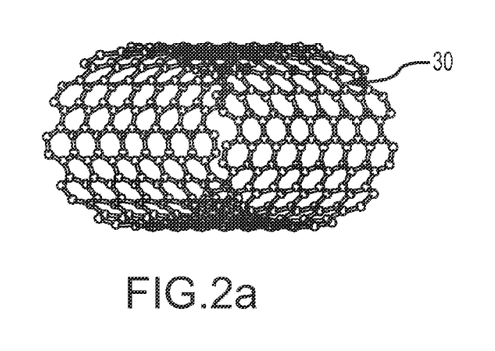
FIGS. 2a and 2b are diagrams of nanostructures including nanotubes and fullerenes.
Figure 2B:
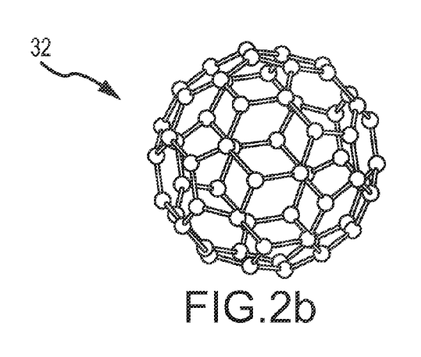

As used herein, "nanostructures" are materials that have at least one dimension in the nanometer scale (i.e. less than 1 micrometer). All three dimensions may be less than 1 micrometer. The nanostructures are suitably electrically conductive. This definition of nanostructures encompasses nanotubes 30 as shown in FIG. 2a, nanowires, nanopowders and fullerenes 32 as shown in FIG. 2b. Fullerenes are spheroidal, closed-cage molecules consisting essentially of $sp^2$-hybridized carbons typically arranged in hexagons and pentagons. Fullerenes, such as $C_{60}$, also known as Buckminsterfullerenes, more commonly, "buckyballs," and $C_{70}$, have been produced from vaporized carbon at high temperature. The nanotube may be single-walled nanotube (SWNT) or a multi-walled nanotube (MWNT). Carbon nanotubes (CNTs) are one commonly found version of a nanostructure. Other materials such as Nitrogen, Boron, Titanium, Silicon, Germanium, Aluminum and Gallium may also be used to form nanotubes. Any material that can be grown or otherwise formed into a nanostructure that couples to the EM pulse and heats up may be used. The nanostructures may be doped to provide more desirable properties such as electrically conductivity.

Figure 3:
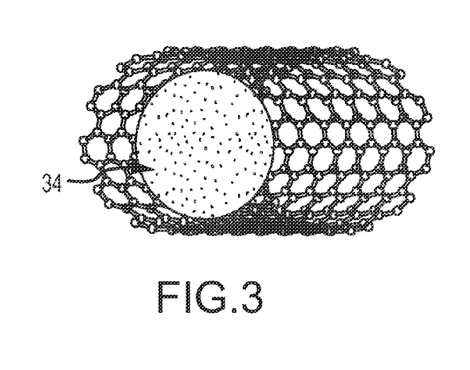
FIG. 3 is a diagram of a nanotube filled with energetic material.

The nanotubes or fullerenes may or may not be filled or partially filled with energetic ("explosive") materials 34 as shown in FIG. 3 (see related co-pending application U.S. Ser. No. 11/530,081 entitled "Improved Explosive Materials By Stabilization In Nanotubes"), which is hereby incorporated by reference. The explosive-laden nanotube can be used to provide a small charge of energy to a selected or predetermined location, which location may be on a micro- or nano-scale. The explosive-laden nanotubes can be used by mixing with a fuel/oxidizer mixture and used as a detonation source, whereby when electromagnetic radiation such as microwave radiation is applied, the explosive nanotubes may be caused to detonate substantially simultaneously, there by allowing for volume combustion of the entire fuel/air mixture In one embodiment, the present invention includes a nanotube containing an explosive compound, including a nanotube having an internal cavity; and an explosive compound contained within the internal cavity of the nanotube. In one embodiment the nanotube is a single-walled carbon nanotube. In one embodiment, the nanotube of the present invention has an internal diameter ranging from about 1 nanometer (nm) to about 20 nm. In another embodiment, the internal diameter of the nanotube of the present invention is in the range from about 1 nm to about 15 nm, and in another embodiment, the internal diameter of the nanotube of the present invention is in the range from about 1 nm to about 10 nm, and in another embodiment, the internal diameter of the nanotube of the present invention is in the range from about 1 nm to about 5 nm. The nanotubes of the present invention may have a length of at least 20 microns, and may be as long as 100 microns, under presently known preparation methods.

In one embodiment, the nanotube of the present invention is a multi-walled nanotube, having any known number of wall layers, for example, ranging from 2 to about 10 or more. In a multi-walled nanotube, the explosive compound may be retained within the cavity in the innermost nanotube, or may be retained between any of the respective layers of the multi-walled nanotube. As will be understood, in multi-walled nanotubes, a range of internal diameters will be present, with the internal diameter of the innermost nanotube being in the foregoing ranges. Multi-walled nanotubes may be in the form of concentric cylinders, for example, a (0,8) single-walled nanotube within a larger (0,10) single-walled nanotube, and so on, for the total number of walls in the multi-walled nanotube. It is also possible for a multi-walled nanotube to resemble a single sheet of graphite rolled up around itself, resembling a scroll of parchment or a rolled up newspaper, in which there are no concentric cylinders. The outside diameter of the multi-walled nanotube may have any known diameter, ranging up to about 150 nm or more, for example. As will be understood, the outside diameter of a multi-walled nanotube depends on the number of wall layers as well as the diameter of the outermost nanotube.

Since, as noted above, the fullerene (or buckyball) is a species of nanotube, the internal diameter of a fullerene generally will fall within the above-disclosed ranges. Like multi-walled nanotubes, fullerenes can be nested one inside another, with the innermost fullerene or one of the shells containing the explosive compound. In another embodiment, a fullerene or a nested fullerene can be nested inside a single- or multi-walled nanotube. Thus, in one embodiment, an explosive compound can be placed inside a fullerene (or a nested fullerene) and one or more such fullerenes (or nested fullerenes) can be nested inside a single- or multi-walled nanotube. In one embodiment, the fullerene can be nested inside a nanotube to act as an isolating agent or separator for providing separation of compounds which, when mixed together either react, e.g., to form an explosive compound or form a spontaneously exploding mixture (i.e., upon mixing the previously separated compounds react explosively) or combine to reach a critical amount or volume resulting in rupture of the nanotube and release of the compound(s).

In one embodiment, the explosive compound comprises one or more of a triacetone triperoxide, diacetone diperoxide, hexamethylene triperoxide diamine, a mononitrotoluene, a dinitrotoluene, a trinitrotoluene, ethylene glycol dinitrate, nitro methane, nitroglycerine, 1,3,5-trinitro-1,3,5-triazacyclooctane, 1,3,5,7-tetratnitro-1,3,5,7-tetraazacyclooctane, pentaerythritol tetranitrate, 1,2,3-propanetrial trinitrate, aluminum metal+$Fe_2O_3$, aluminum metal+PTFE (e.g., nano-sized and stabilized), metal azides, e.g., $XN_3$, (where X=Na, Pb, Cu, Ag, for example, and mixtures thereof) ammonium nitrate ($NH_4NO_3$), polymorphic nitrogen, e.g., polymorphic nitrogen with cubic gauche structure (cg-N) and polynitrocubanes. Other known explosive compounds can be used in accordance with the present invention, the foregoing being examples only.

Figure 4:
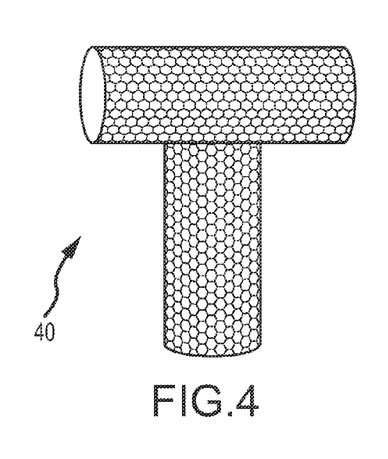
FIG. 4 is a diagram of nanostructure configured to improve coupling to the electromagnetic pulse.

Nanostructures may interact with electromagnetic energy through different pathways including conduction, resonances and bond vibrations. The specific pathway of absorption isn't as important as the rate. The absorption rate of these structures to radiation in the long wave RF, microwave and THz ranges can be very high. This high rate allows them to heat up very rapidly and produce an efficient volumetric explosion. Nanostructures such as nanotubes or nanowires that have an aspect ratio (length/diameter) greater than 1 and typically greater than 10 generally exhibit a higher absorption rate. These structures are more conductive than fullerenes and powders and tend to have induced and permanent dipole moments that enhance the resonant coupling between structures. These structures also send to exhibit better migration during electrophoresis. As shown in FIG. 4, nanostructures 40 may be configured to further enhance the resonant coupling to the electromagnetic radiation, and to preferentially couple to electromagnetic radiation in a specific band.

The nanotubes of the present invention may be prepared by any known method, and some are commercially available. In general, each of these synthesis processes produces CNTs as a tangled mess. The CNTs are held together by various forces, most noticeably Van der Waals forces. A wide variety of methods have been devised for producing CNTs since the early disclosures by Iijima et al., including "Helical microtubules of graphitic carbon", NATURE, 354, 56 (1991) and "Single-shell carbon nanotubes of 1-nm diameter", NATURE, 363, 605-606 (1993). For example, a number of methods are mentioned in U.S. Pat. No. 7,052,668, the disclosure of which relating to preparation of SWCNTs is incorporated herein by reference. SWCNTs are commercially available presently in small commercial quantities. Various methods are known for synthesis of carbon nanotubes, and presently there are three main approaches. These include the laser ablation of carbon (Thess, A. et al., SCIENCE 273, 483 (1996)), the electric arc discharge of graphite rod (Journet, C. et al., NATURE 388,756 (1997)), and the chemical vapor deposition of hydrocarbons (Ivanov, V. et al., CHEM. PHYS. LETT. 223, 329 (1994); Li A. et al., SCIENCE 274, 1701 (1996)). The production of multi-walled carbon nanotubes by catalytic hydrocarbon cracking is conducted on a commercial scale (U.S. Pat. No. 5,578,543), while the production of single-walled carbon nanotubes was still in a gram scale (as of 1998) by laser (Rinzler, A. G. et al., APPL. PHYS. A. 67, 29 (1998)) and arc (Haffner, J. H. et al., CHEM. PHYS. LETT. 296, 195 (1998)) techniques. The nanotubes of the present invention may be prepared by any of the variety of techniques known in the art, assuming the proper purity and defect requirements can be met. Such defects include known nanotube defects, such as holes or openings in the nanotube wall or walls caused by one or more missing atoms. As known in the art, such defects can often be removed by irradiation of the nanotubes.

Internal Combustion with Nanostructure Injection

Without loss of generality an embodiment of the invention will be described for the injection of carbon nanotubes (CNTs). CNTs are of particular interest in part because the processes for manufacturing and characterization of CNTs is further along than other materials and in part because the "carbon" gets burned up with the hydrocarbon during combustion, leaving no additional pollutants.

Figure 5:
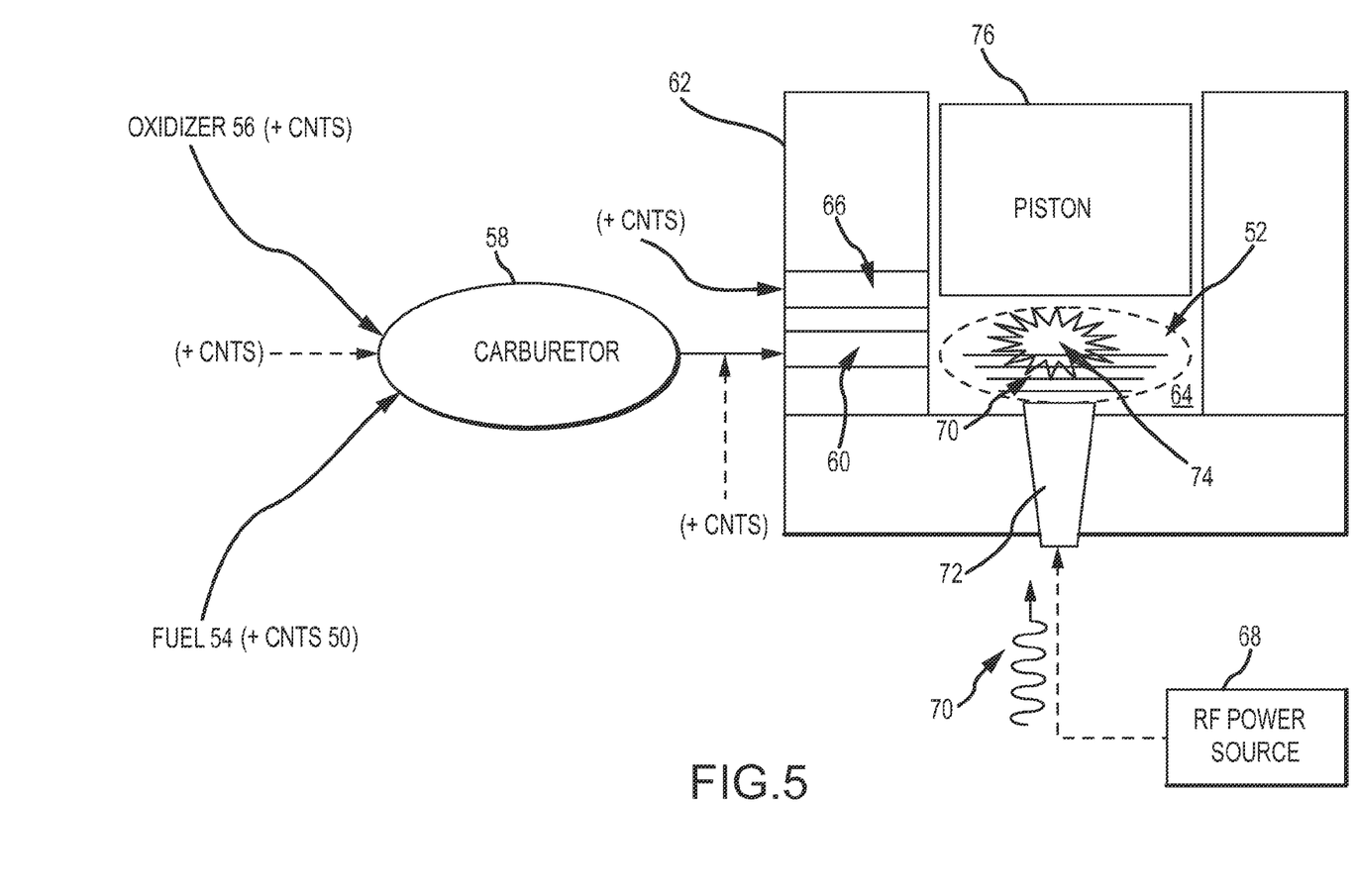
FIG. 5 is a diagram illustrating the injection of nanostructures into the combustion chamber to improve the ignition of the fuel/oxidizer mixture by an electromagnetic pulse.

As illustrated in FIG. 5, CNTs 50 may be introduced to the fuel/oxidizer mixture 52 at one or more locations in the process. In an embodiment, the CNTs 50 are pre-mixed with the fuel 54 as an "additive", the fuel is than mixed with the oxidizer 56 in a standard process such as by a carburetor 58 to form fuel/oxidizer mixture 52, which is then injected through a port 60 in a wall of cylinder 62 into the combustion chamber 64. In a second embodiment, the CNTs 50 are pre-mixed with oxidizer 56 as an "additive". In a third embodiment, fuel 54, oxidizer 56 and CNTs 50 are each input to and mixed by the carburetor 58. In a fourth embodiment, CNTs 50 are mixed with the fuel/oxidizer mixture 52 produced by carburetor 58. In a fifth embodiment, CNTs 50 are injected directly into combustion chamber 64 through a second port 66. In a sixth embodiment, fuel 54, oxidizer 56 and CNTs 50 are each input directly to and mixed in combustion chamber 64. It should be understood that any location, timing or manner of mixing the CNTs with the fuel/oxidizer is acceptable.

The fuel/oxidizer mixture 52 may be homogeneous or non-homogeneous. The injection of CNTs may be homogeneous or non-homogeneous in either time or location in the chamber. For example, the CNTs may be injected with each injection of fuel/oxidizer. Alternately, the CNTs may only be injected if the process is being run relatively "lean". The CNTs may be injected to be fairly uniform throughout the chamber or may be injected to be more or less dense in different portions of the chamber.

An RF power source 68 generates an EM pulse 70 that is output via a horn 72 (or other means to couple the EM pulse into the chamber) and directed into combustion chamber 64. Chamber 64 may be designed as a waveguide for the frequency band of the EM pulse. The electromagnetic pulse couples energy to the CNTs 50 to produce a volumetric combustion 74 of the fuel/oxidizer mixture. Although the length of the nanostructures (tens to hundreds of nanometers to tens to hundreds of microns) is much less than the wavelength of the EM pulse (few centimeters) (and the length of a classical antenna to receive that pulse), there are other mechanisms for coupling RF energy to the nanostructures. It is believed that plasmon resonances couple energy from the pulse to the nanostructures to produce the desired resistive heating. Whatever the mechanism, the coupling of EM pulse energy to resistively heat the nanostructures is well established by experiments at different frequencies including 2.45 GHz (approx. 12 cm wavelength) and 10 GHz (approximately 3 cm wavelength). The volumetric combustion expands in the chamber producing a force on piston 76 causing it to move a distance to produce mechanical work. The fuel/oxidizer mixture may be substantially transparent to the band of the electromagnetic pulse. The CNTs couple to the electromagnetic radiation 70, absorb the energy and heat rapidly producing many local ignitions that in turn produce volume combustion 74.

Figure 6A:
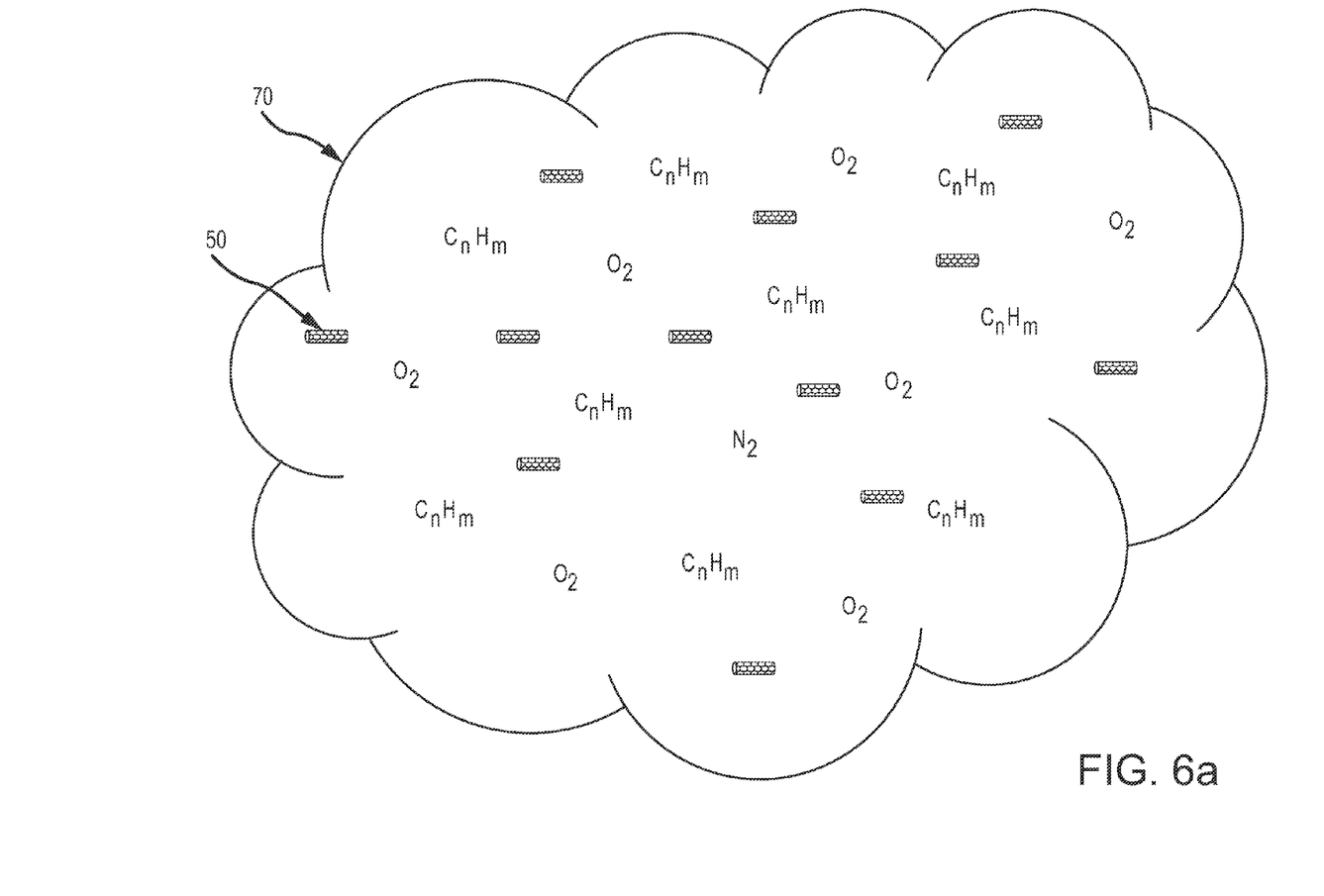
FIGS. 6a through 6c illustrate the fuel/oxidizer mixture in the chamber with nanostructures dispersed there through, the transmission of an electromagnetic pulse and coupling to the nanostructures to generate many ignition points and the ensuing volumetric combustion.
Figure 6B:
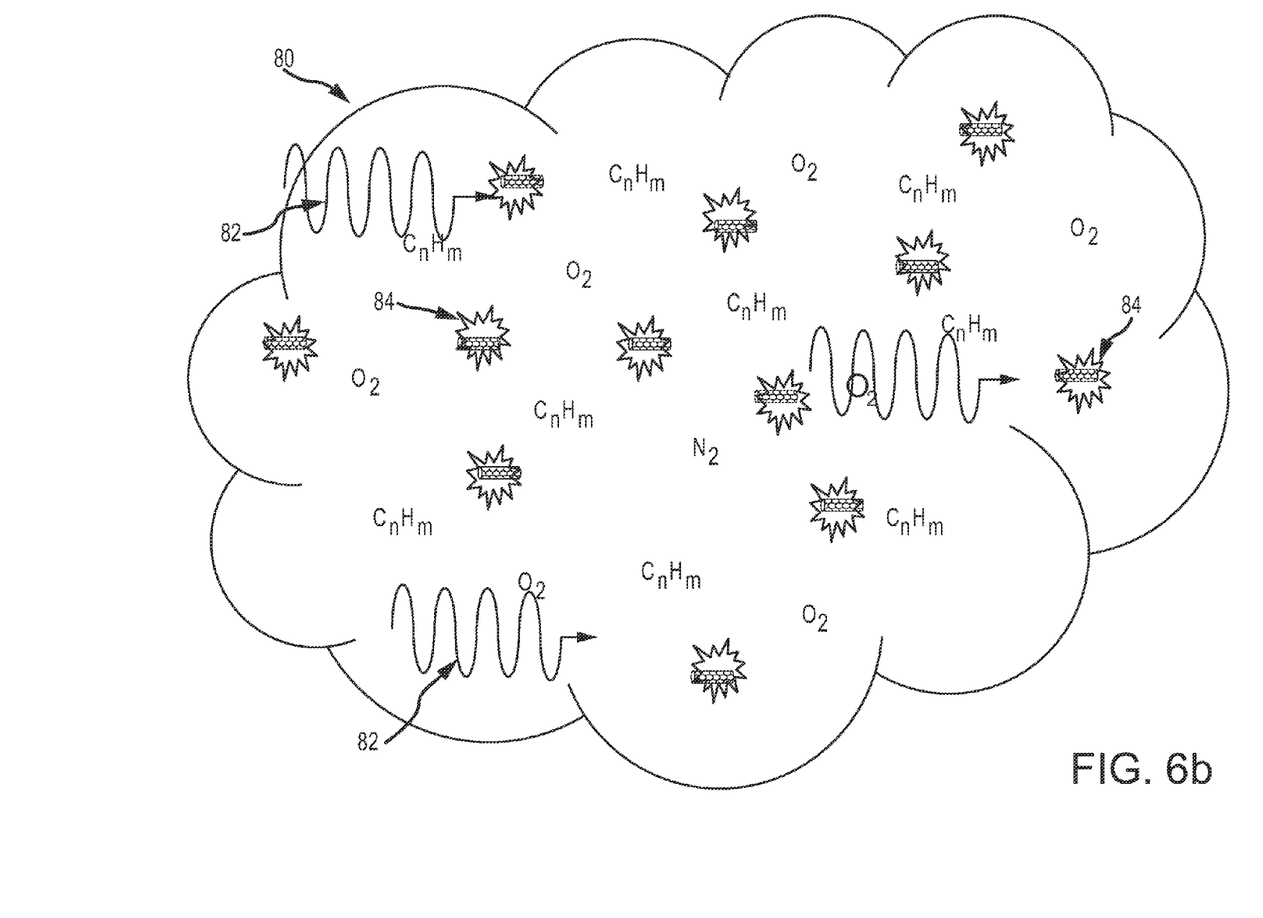
Figure 6C:
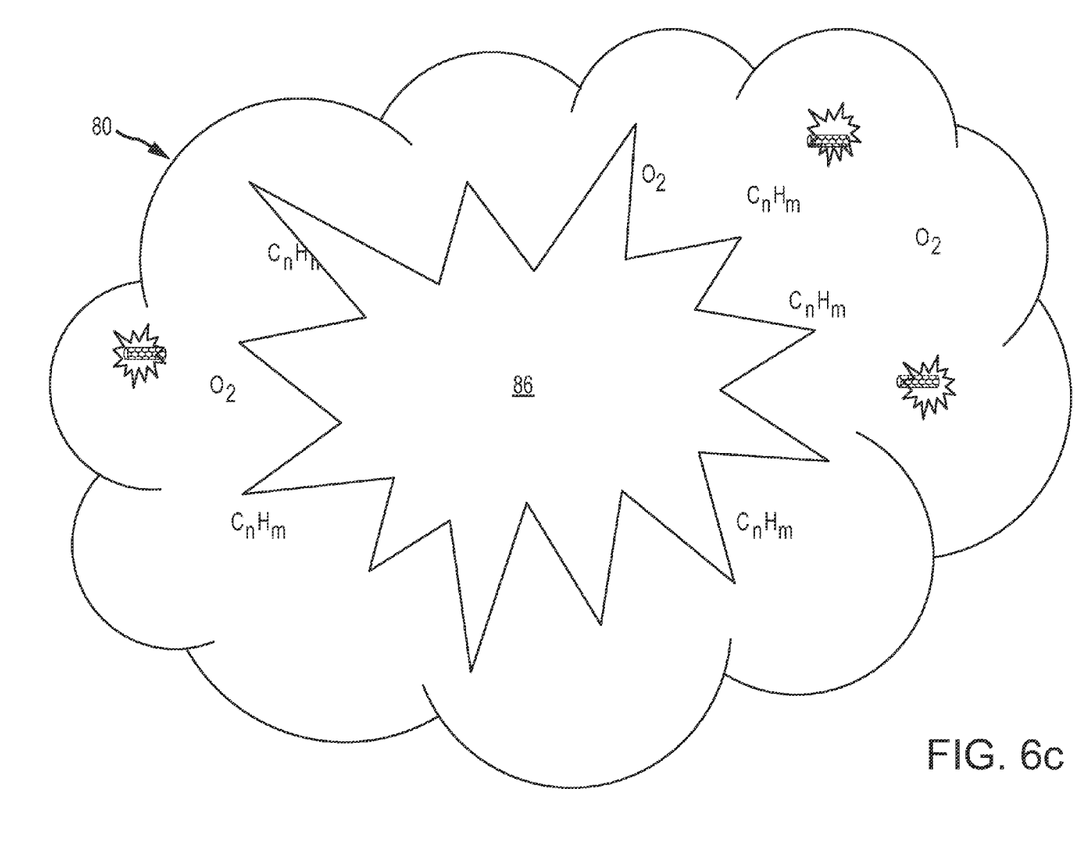

A sequence of injecting the fuel/oxidizer mixture and CNTs and igniting the CNTs with an EM pulse to produce a volumetric combustion of the fuel/oxidizer mixture is illustrated in FIGS. 6a through 6c. As shown in FIG. 6a, in an embodiment a mixture 80 comprises fuel 54 (e.g. a hydrocarbon symbolized by $C_nH_m$ molecules), oxidizer 56 (e.g. air including $O_2$ and molecules) and CNTs 50. As shown in FIG. 6b, an electromagnetic pulse 82 propagates through the largely transparent fuel/oxidizer mixture, couples to the individual CNTs 50, which in turn absorb the energy and rapidly heat up to provide many local "sparks" or "combustions" 84 throughout the mixture. As shown in FIG. 6c, these local "sparks" or "combustions" 84 produce and sustain a volumetric combustion 86 within the chamber.

In an embodiment the fuel/oxidizer mixture is largely transparent to the EM pulse. Although this is a needed property for the pulse to propagate throughout the mixture to cause a volumetric explosion, it is also, at least in part, why previous attempts at volumetric combustion using microwave energy has failed. Because the fuel/oxidizer mixture is largely transparent to microwave energy, the molecules do not readily couple to the incident energy and thus any local "sparks" or "combustion" are weak, and do not sufficiently catalyze and maintain the flame front. By contrast, nanostructures are of a dimension and construct that more readily couple to the incident microwave radiation, thereby absorbing energy and rapidly heating to create hot spots in the mixture. The nanostructures may also tend to sustain the heat longer to maintain the flame front.

In an embodiment, an EM pulse may typically lie somewhere in a frequency range of 1-100 GHz e.g. microwave (1 GHz to 30 GHz) and terahertz (30 GHz to 10 THz). Higher or lower frequencies may be possible depending on both the ability of the nanostructures to couple to the EM band and the transparency of the fuel/oxidizer to the EM band. If the wavelength is too long, the energy will not couple sufficiently to the nanostructures. If the wavelength is too short, the energy will be rapidly absorbed in the fuel/oxidizer mixture. A typical pulse may be approximately 10 GHz (3 cm) or 2.45 GHz (12 cm) for example.

Hybrid Internal Combustion with Single-Point Spark and Volume Ignition

In some applications it may be desirable to have a "hybrid" ignition system combining both convention single-point spark ignition and the nanostructure injected multi-point ignition of the present invention.

Figure 7:
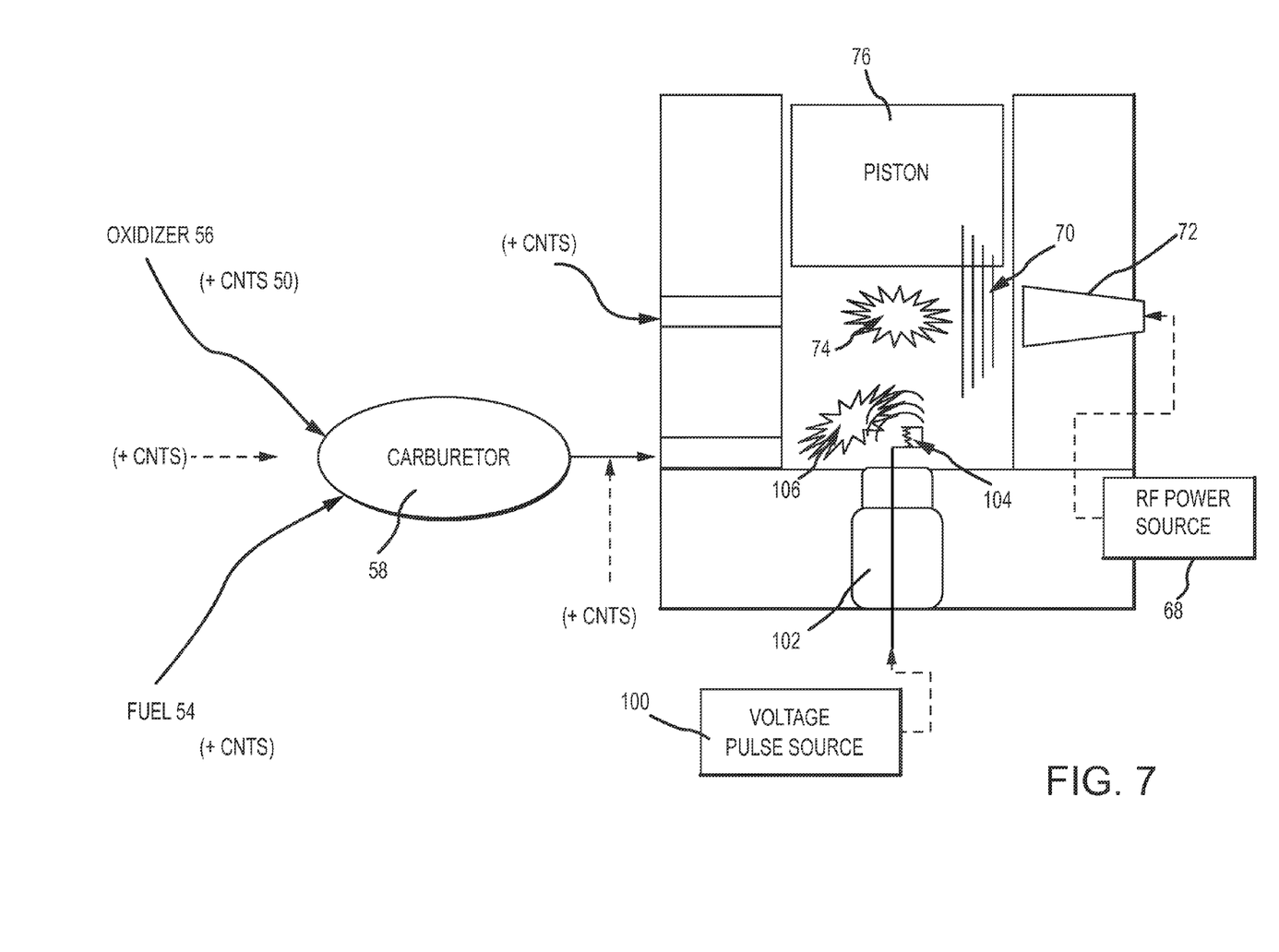
FIG. 7 is a diagram of a hybrid system that utilizes both point combustion via a spark plug and volume combustion via an electromagnetic pulse with nanostructure injection.

As shown in FIG. 7, the internal combustion system of FIG. 5 is modified to include a source 100 that applies a voltage pulse to a spark plug 102 to produce a spark 104 and single-point combustion 106 at the base of chamber 64. In this particular embodiment, RF power source 68 and horn 72 are configured to inject the EM pulse 70 through a port 108 in the cylinder at a position higher in the chamber. The CNTs 50 may be mixed with the fuel/oxidizer mixture 50 prior to injection into the chamber and dispersed approximately uniformly throughout. Alternately, CNTs 50 may be injected directly into the chamber through port 66 positioned higher in the chamber to concentrate the CNTs in the upper portion of the chamber. In this configuration, injection of the fuel/oxidizer mixture 52 and application of the "spark" 104 and injection of CNTs and application of EM pulse 70 are timed to ignite and sustain volume combustion. If the mixture is "lean", the conventional spark plug may not be sufficient to maintain the flame front as it propagates upwards in the chamber. The CNTs and EM pulse provide additional energy to sustain the flame front.

While several illustrative embodiments of the invention have been shown and described, numerous variations and alternate embodiments will occur to those skilled in the art. For example, there may be other configurations of internal combustion engines to produce mechanical work, other configurations for mixing the nanostructures with the fuel/oxidizer mixture and other configurations for directing an EM pulse into the combustion chamber. Furthermore, although the currently anticipated use of nanostructure injection is to improve internal combustion of "lean" fuel/oxidizer mixtures, it may be use to inject nanostructures into "rich" fuel/oxidizer mixtures to improvement combustion. For example, in a traditional gasoline engine that runs "rich", nanostructures and EM pulse ignition may be useful to produce "volumetric combustion" to improve fuel efficiency. Such variations and alternate embodiments are contemplated, and can be made without departing from the spirit and scope of the invention as defined in the appended claims.

We claim:

1. A method of internal combustion, comprising:
providing an engine including an internal combustion chamber and a moveable mechanical structure;
providing a volume of a fuel/oxidizer mixture and nanostructures dispersed throughout the volume inside the combustion chamber; and
directing an electromagnetic pulse into the combustion chamber to penetrate the volume of the fuel/oxidizer mixture, said pulse heating the nanostructures to produce ignitions that produce a volumetric combustion of the fuel/oxidizer mixture to move the mechanical structure over a distance to perform mechanical work.

2. The method of claim 1, wherein the moveable mechanical structure comprises at least one piston.

3. The method of claim 1, wherein the fuel comprises a hydrocarbon.

4. The method of claim 3, wherein the hydrocarbon comprises gasoline, diesel, petroleum gas or biofuels including ethanol and biodiesel.

5. The method of claim 1, wherein the oxidizer comprises air.

6. The method of claim 1, wherein the nanostructures comprise nanotubes or fullerenes.

7. The method of claim 6, wherein the nanostructures are filled with an energetic material.

8. The method of claim 7, wherein the energetic material comprises one or more of a triacetone triperoxide, diacetone diperoxide, hexamethylene triperoxide diamine, a mononitrotoluene, a dinitrotoluene, a trinitrotoluene, ethylene glycol dinitrate; nitro methane, nitroglycerine, 1,3,5-trinitro-1,3,5-triazacyclooctane, 1,3,5,7-tetratnitro-1,3,5,7-tetraazacyclooctane, pentaerythritol tetranitrate, 1,2,3-propanetrial trinitrate, aluminum metal+$Fe_2O_3$, aluminum metal+PTFE (e.g., nano sized and stabilized), metal azides, e.g., $XN_3$, (where X=Na, Pb, Cu, Ag, for example, and mixtures thereof) ammonium nitrate ($NH_4NO_3$), polymorphic nitrogen, e.g., polymorphic nitrogen with cubic gauche structure (cg-N) and polynitrocubanes.

9. The method of claim, wherein the nanostructures are formed from Carbon.

10. The method of claim 1, wherein the electromagnetic pulse lies within a band of approximately 1 GHz to approximately 100 GHz and suitably near 2.45 GHz or 10 GHz.

11. The method of claim 1, wherein the nanostructures are pre-mixed with the fuel prior to mixing with the oxidizer.

12. The method of claim 1, wherein the nanostructures are introduced by one of the following:
pre-mixing with the fuel;
pre-mixing with the oxidizer;
mixing with the fuel and oxidizer and then injecting into the combustion chamber;
mixing with the fuel/oxidizer mix and then injecting into the combustion chamber; and
mixing with the fuel and oxidizer in the combustion chamber.

13. The method of claim 1, wherein the mix of nanostructures is non-homogeneous.

14. The method of claim 1, wherein the nanostructures are selectively injected when the process runs lean.

15. The method of claim 1, wherein the nanostructures are electrically conductive.

16. The method of claim 1, wherein the fuel/oxidizer mixture is lean in that the air-fuel ratio (AFR) defined as the mass ratio of air to fuel present during combustion is greater than the AFR for a stoichometric mixture.

17. The method of claim 1, wherein the fuel/oxidizer mixture is rich in that the air-fuel ratio (AFR) defined as the mass ratio of air to fuel present during combustion is less than the AFR for a stoichometric mixture, said ignition of the nanostructures using an electromagnetic pulse being useful to produce the volumetric combustion.

18. An internal combustion engine, comprising:
an internal combustion chamber;
a moveable mechanical structure in the chamber;
means for providing a volume of a fuel/oxidizer mixture and nanotubes or fullerenes dispersed throughout the volume inside the combustion chamber; and
a source that directs an electromagnetic pulse into the combustion chamber to penetrate the volume of the fuel/oxidizer mixture, said pulse heating the nanotubes or fullerenes to produce ignitions that produce a volumetric, combustion of the fuel/oxidizer mixture to move the mechanical structure over a distance to perform mechanical work.

* * * * *